United States Patent [19]

Cole et al.

[11] 4,419,997
[45] Dec. 13, 1983

[54] METHOD OF FABRICATING TWO LAYER CUPS AND BRASSIERE

[75] Inventors: Raymond Cole, Hillsdale; Raymond Kennedy, Montvale; Lincoln McCluskey, Montville, all of N.J.

[73] Assignee: International Playtex, Inc., Stamford, Conn.

[21] Appl. No.: 467,614

[22] Filed: Feb. 17, 1983

Related U.S. Application Data

[62] Division of Ser. No. 280,402, Jul. 6, 1981, Pat. No. 4,375,445.

[51] Int. Cl.$^3$ .............................................. A41C 3/00
[52] U.S. Cl. .................................. 128/489; 128/464
[58] Field of Search ............... 128/464, 463, 489, 492, 128/498, 499, 500

[56] References Cited

U.S. PATENT DOCUMENTS 3,119,393  1/1964  Bernfeld .............................. 128/489
3,353,540  11/1967  Ertezek ................................ 128/489

Primary Examiner—Doris L. Troutman
Attorney, Agent, or Firm—Stewart J. Fried

[57] ABSTRACT

A cup is molded from two layers of stretchable materials by molding first the crown portion, inverting the materials and then molding the remainder of the cup. The resulting cup has a non-stretchable crown portion, a substantially non-stretchable longitudinal cup portion and a unitary multi-directional stretchable periphery portion. A pair of these cups are used to form a unique brassiere wherein the base layer forms a unitary cup, support frame and torso-encompassing portion.

4 Claims, 5 Drawing Figures

METHOD OF FABRICATING TWO LAYER CUPS AND BRASSIERE

This is a divisional application of Ser. No. 280,402, filed July 6, 1981.

BACKGROUND OF THE INVENTION

The present invention relates generally to brassieres and more specifically to a method of making an improved brassiere cup which includes a shape supporting panel in the cup.

These shape supporting panels in the cup which form less than the full three dimensional structure of the cup are well known. Similarly the problems in fabricating such cups are also well known as described in U.S. Pat. 4,172,002 to Gluckin. As a solution to the prior art problems, Gluckin suggests laminating the support panel to a thermoplastic support material and then adhering both to a ply of material from which the complete cup is to be formed. The three layer composite lamina is then molded to form the complete cup over a hot molding die. Although Gluckin solves the problem of the prior art of puckering or wrinkling of the material, the use of the thermoplastic support material and the heating to create a bond creates a stiff breast cup of undesirable hand.

Another problem with the Gluckin method is that the support panel acts as a thermal insulator to the extent that the outside layer is not evenly heated. This causes uneven stretching of the outside layer during molding which unevenly changes the characteristics and thickness of the outside layer. Thus, the thickness of the cup will vary since the outside layer in the three-layered portions is not reduced as much as it is in the two-layered portions.

Gluckin deals specifically with polyesters versus stretchable materials and thus does not consider the problem of molding two layers of stretchable materials over an open male mold. Even though Gluckin discusses molding using a male mold on one side, the same problem would exist for the center layer of three layers using both a male and female mold simultaneously.

Other prior art techniques of forming a composite cup having a support patch include molding the patch and the brassiere cup separately and then joining them by sewing along the periphery of the patch. Since the two layers are molded separately, they cannot always be matched in the post-molded condition and thus undesirable wrinkles and creases are produced.

With the fashion trend to the natural look, the number of seams and stiff portions of a brassiere must be reduced to a minimum. Thus, it is desirable to make as many pieces unitary thereby eliminating seams.

SUMMARY OF THE INVENTION

An object of the present invention is to provide a two-layer molded brassiere cup of increased hand.

Another object of the present invention is to provide a two-layer molded breast cup without the need of prior lamination of the layers.

A further object of the present invention is to provide a two-layer molded breast cup with varying stretch characteristics along the longitude of the cup.

Still another object of the present invention is to provide a brassiere incorporating a two-layer molded breast cup of increased hand.

An even further object of the present invention is to provide a two-layer molded brassiere cup having uniform thickness along each layer of the cup.

A still further object of the present invention is to provide a brassiere having the minimum number of seams.

These and other objects of the invention are attained by attaching the first layer or support panel to a second layer which forms more than the area of the to-be-formed cup. The crown area of the to-be-formed cup is clamped to include both the first and second layers, and it is stretched over a hot male mold. The fabric is then inverted and clamped to form a total cup area larger than the crown area which is then stretched over a hot male mold. The resulting structure is a two-layer molded breast cup wherein the first area or crown is non-stretchable, the remainder of the breast cup has substantially no longitudinal stretch and the remaining area of the two layers has complete multiple directional stretchability of the original two-layer fabrics.

The first layer may be cut to have an area less than the full area of the to-be-formed cup and is attached around its periphery to the second layer. The second layer may be cut to form a unitary breast cup, support frame and torso-encompassing portion. It is then joined at a lateral edge with a second unitary breast cup, support frame and torso encompassing section to form a complete brassiere. Elastomeric trim is attached to the upper edges of the second layer and a continuous elastomeric band is attached along the bottom of the joined second layers. Fasteners are attached to the other lateral edges of the second layer, and shoulder straps are attached to the second layer.

Other objects, advantages and novel features of the present invention will become evident from the detailed description of the invention when considered in conjunction with the accompanying drawings.

DESCRIPTION OF THE PREFERRED EMBODIMENTS

Figure 1:
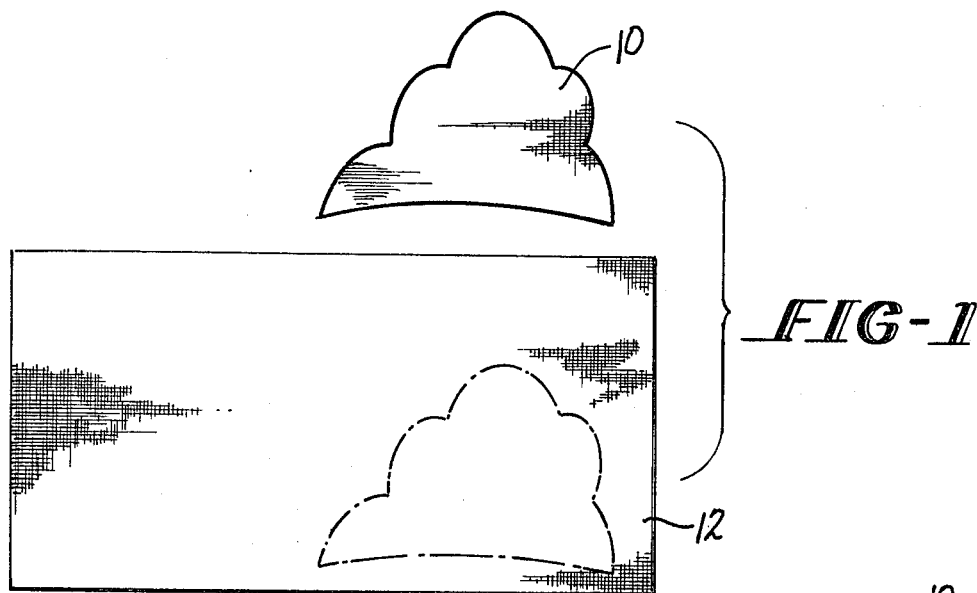
FIG. 1 is a perspective view of the first and second layers prior to attachment.
Figure 2:
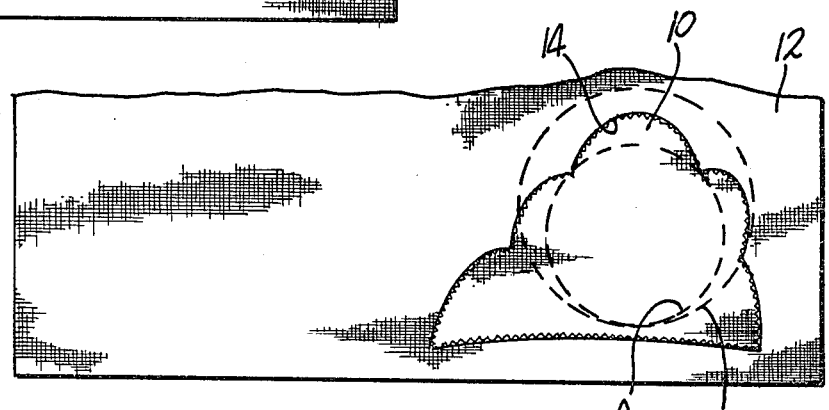
FIG. 2 is a plan view of the first and second layers after attachment illustrating the first and second clamping areas.

The method of fabricating a two-layer molded breast cup begins as illustrated in FIG. 1 with a first layer 10 cut to form less than the full area of the to-be-formed cup positioned and a second layer 12 which is larger than the area of the to-be-formed cup. The first layer 10 is attached to the second layer 12 about its periphery preferably by stitching 14 as shown in FIG. 2. The first layer 10 and second layer 12 are chosen to be of multi-directional stretch material or fabric which includes spandex or other heat-treatable stretchable polymers. One such fabric is Lycra. It should be noted that other methods of attaching the two layers together may be used, for example, bonding the first layer about its periphery to the second layer. As noted previously, the use of adhesive or other bonding techniques may be undesirable since it decreases the softness and adds some rigidity to the final structure and thus decreases the hand.

Although the present description will be directed to the first layer being cut to form less than the full cup area, the method of the present invention is applicable to any two-layer stretch fabric cup construction. The first layer can be cut to have an area equal to the total cup area or even the same area as the second layer.

For purpose of clarity, a first dotted area A is shown in FIG. 2 defining the crown portion of the to-be-formed cup. A second dotted line illustrates the second area B which is the total area used to form the total cup.

Figure 3:
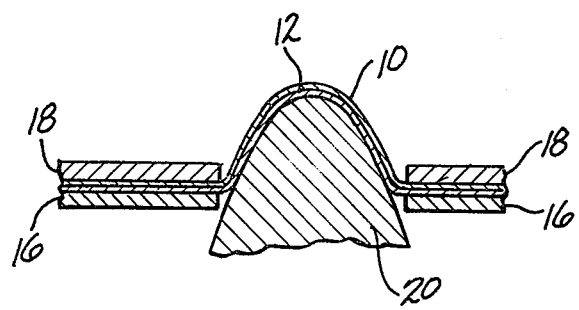
FIG. 3 is a cross-sectional view illustrating the first molding step incorporating the principles of the present invention.

The two layers 10 and 12 are clamped in a frame having two clamping members 16 and 18 with an opening defining the area A marked in FIG. 2. This clamp confines the stretching or molding of the material to the A area to define the crown of the breast cup. The clamped material is then stretched over a first heated male mold 20 as illustrated in FIG. 3. The temperature of the mold and the time of molding are selected such that the elastomeric material of fabric layers 10 and 12 in the crown area A have been stretched to their maximum and the heating setting of this area has just started. There is some degree of stretch in the crown A after the first molding step and this stretch is easy and about in balance with the single ply area of the cup. It should be noted that in the first molding step of FIG. 3, the second fabric material 12 is against the mold 20 with the first fabric layer 10 not in contact with the mold 20. For a Lycra fabric, the first molding period is in a range of 5 to 10 seconds with the male mold have a temperature in the range of about 388° F. to 395° F.

The two layers of material 10 and 12 are then removed from the clamp frame 16 and 18, inverted and placed in a second clamp frame having members 22 and 24. The second clamp frame has an opening defining the area B illustrated in FIG. 2. This area B defines the base of the finally formed breast cup. The frames 22 and 24 are then lowered onto a second heated male mold 20' with the first layer of fabric 10 against the mold 20'. This stretches the fabric layers 10 and 12 in the area B with the frames 22 and 24 limiting the stretch to this area B. The molding period is in the range of 20 and 35 seconds with the temperature in the range of about 392° F. to 400° F.

Since the crown area A has been substantially preformed in the previous molding step, there is almost no additional stretching of the crown. This allows a more evenly divided stretch force along the area between the crown portion A and the periphery B. Thus, the cup has a more evenly defined shape. By molding the crown portion first, the stress along this portion is more evenly divided and thus the undesirable thinning at the apex of the crown is avoided.

By inverting the composite material between the first and second molding step, the layers 10 and 12 in the crown area both are subjected to substantially the same amount of heat. Thus, they have uniform structure. If this did not take place, the layer of material closest to the mold would set faster and harder which is undesirable.

The combined double molding process of the present invention produces a cup having a crown and remainder of cup portions of different stretch characteristics than the original material or fabric. The crown portion A is non-stretchable and the remainder of the cup portion, between the crown portion A and the periphery B, is non-stretchable in the longitudinal direction indicated by the arrow L in FIG. 4 while having stretchability in the transverse direction indicated by the arrow T. The remainder of the first and second layers external to the area B maintain the multi-directional stretchability. This specific combination of multiple layers of material and their selected degrees of stretchability produce a very unique cup. The crown portion being non-stretchable provides shape to the crown portion of the cup. The remainder of the cup being non-stretchable in the longitudinal direction provides support and uplift in the cup and also the stretchability in the transverse directions allows for adjustability for the size of the cup. This is needed since most women are not truly a given cup size. The remainder of the frame being stretchable in the multi-direction allows the remainder of the material to be used as a support frame and thus alleviates one of the major seams in a brassiere in construction, namely the seam that attaches the cup to its support frame.

It should be noted that although the process is illustrated wherein the second layer 12 is first applied against the mold and then inverted with the first layer 10 finally being against the mold, these may be reversed. Since the first layer or support patch 10 is to be on the interior of the finally formed cup, it is preferred that it be against the mold in the final or second molding step.

Figure 4:
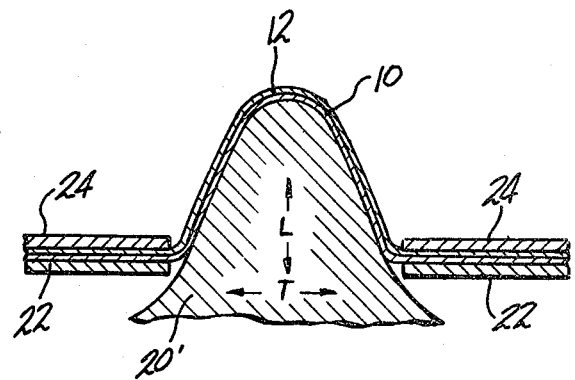
FIG. 4 is a cross-sectional view illustrating the second molding step incorporating the principles of the present invention.

Although the processes of FIGS. 3 and 4 were illustrated using two male molds 20 and 20', the first mold merely has the shape of the crown and the second mold being the shape of the total cup, it is evident that a single mold may be used. The process of FIGS. 3 and 4 would be carried out on a single male mold by lowering the clamping frames down a first depth to define first the crown in the first molding step and after inverting and reclamping, lowering the clamping frame down a second depth greater than the first depth to form the full cup portion in the second molding step. The present process can be carried out on a standard male molding machine.

Although it is preferred that the base layer 12 be relatively large to facilitate clamping during the molding process and the subsequent cutting to form the shape of the unitary breast cup, support frame and torso-encompassing portion, the layer 12 may be cut prior to molding if so desired.

Figure 5:
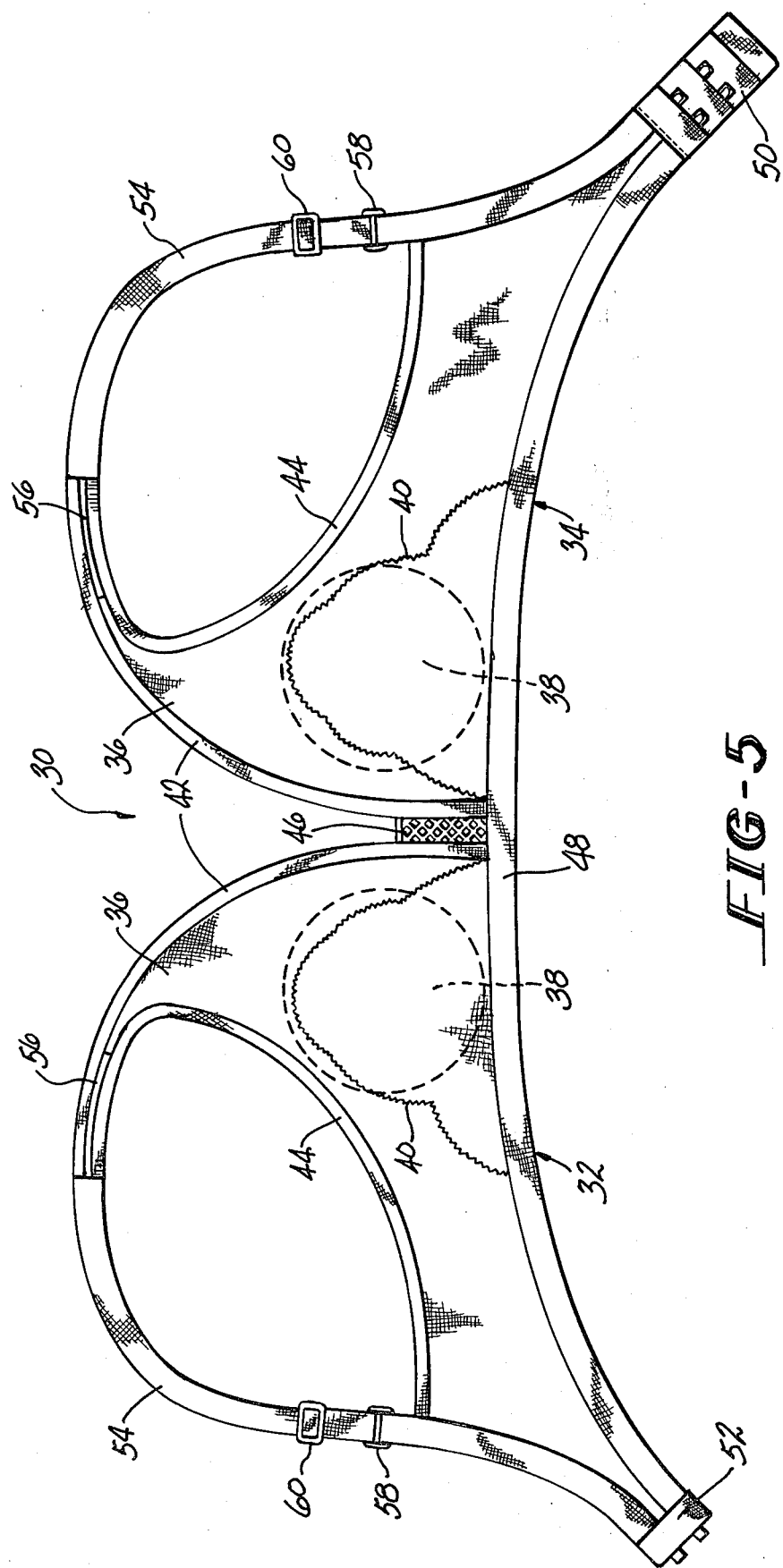
FIG. 5 is a front elevational view of a brassiere constructed in accordance with the present invention with the torso-encompassing portion shown turned into the plane of the front portion thereof.

The unique two-layer molded cup fabricated according to FIGS. 1–4 may be used to form a brassiere having unique characteristics. Referring to FIG. 5, a brassiere 30 is shown having a pair of bust assemblies 32 and 34. Each bust assembly includes a unitary layer 36 forming the breast cup, support frame, and torso-encompassing portion. A patch 38 is attached to the interior of the cup by stitching 40 and forms almost all of the lower cup portion and a substantial portion of the upper cup portion as well as a lower portion of the support frame. The upper portions of layer 36 forming the support frame have attached thereto elastomeric trim 42 and 44.

The lower inner lateral edge of the bust assemblies 32 and 34 are joined by a medium panel 46 which is illustrated as an open net pattern. The continuous elastomeric band 48 is attached along the bottom edge of the support frame of the joined bust assemblies 32 and 34. Complementary fasteners, for example, hook and eyes 50 and 52 are attached to the exterior lateral edge of the layer 36 which forms the torso-encompassing portion.

A pair of shoulder straps 54 are connected to the top portion of the single layer 36 of the support frame directly or through a highly elastomeric portion 56. The other end of the strap 54 is connected through a ring 58 to the torso-encompassing portion of the layer 36. An adjustable element 60 is provided on the strap 54.

It should be noted that although the brassiere illustrated in FIG. 5 shows the breast cup assemblies 32 and 34 joined in the center by the panel 46 and the complementary fasteners 50 and 52 at the opposite lateral edges, the fasteners may be provided in the center and the torso-encompassing portions secured together at their end. Also, the cup assemblies 32 and 34 may be joined directly to each other without center panel 46.

As can be seen by an examination of the brassiere 30 of FIG. 5, there are no seams on the bra cup, support frame or torso-encompassing section except for along the edges wherein the elastomeric trim or band are attached other than the thin stitching attaching the patch 38 to the layer 36. Thus, the amount of undesirable seams and stitchings have been eliminated. By using the unique process of FIGS. 1-4, a unitary bra cup, support frame and torso-encompassing portion are provided which have the same structural support and give of prior art brassieres without the undesirable appearances of prior art brassieres.

From the preceding description of the preferred embodiments, it is evident that the objects of the invention are attained in that a unique process for fabricating a breast cup and a resulting brassiere are shown. Although the invention has been described and illustrated in detail, it is clearly understood that the same is by way of example and illustration only and is not to be taken by way of limitation. The spirit and scope of the present invention are to be limited only by the terms of the appended claims.

What is claimed:

1. In a brassiere having a pair of breast cups, a support frame for each cup, and torso-encompassing portions for each support frame and shoulder straps, the improvement comprising:
    a first layer of material forming a substantial portion of each of said breast cups, and a portion of said support frame;
    a second layer of material forming said breast cups, said support frame and said torso-encompassing portion;
    said first layer being attached to said second layer at the periphery of the first layer;
    said first and second layers being non-stretchable at the crown of the cups, substantially non-stretchable longitudinally at the remainder of the cup and stretchable multi-directionally at the support frame.

2. The brassiere according to claim 1 wherein said first layer is substantially triangular and forms almost all of the lower portion of said breast cup and a substantial portion of the upper portion of said cup.

3. The brassiere according to claim 2 wherein said first layer forms the lower portion of the support frame with the juxtaposed portion of said second layer.

4. The brassiere according to claim 1 wherein said support frame includes elastomeric trim attached along its edges.

* * * * *